United States Patent

[11] 3,594,612

[72] Inventor Joseph R. Gately
 Woodside, N.Y.
[21] Appl. No. 13,510
[22] Filed Feb. 24, 1970
[45] Patented July 20, 1971
[73] Assignee Forbaro Design Corp.
 New York, N.Y.

[54] OVERVOLTAGE PROTECTOR FOR THE LOAD OF FAST-SLEWING REGULATED POWER SUPPLIES
 6 Claims, 3 Drawing Figs.

[52] U.S. Cl. .................................................. 317/16,
 307/237, 317/31, 317/33 VR, 317/36 TD, 323/8
[51] Int. Cl. .................................................. H02h 3/20
[50] Field of Search .......................................... 317/16, 31,
 33 VR, 36 TD; 323/8; 307/237

[56] References Cited
UNITED STATES PATENTS
3,449,634 6/1969 Hung .......................... 317/33 (VR) X
3,524,124 8/1970 Perkinson ..................... 317/33 (VR) X

*Primary Examiner*—James D. Trammell
*Attorney*—Alfred W. Barber

ABSTRACT: Fast-slewing regulated power supplies exhibit very short duration transient overvoltage conditions. These overvoltage spikes are attenuated when above a predetermined level. Overvoltage conditions of longer duration activate further clamping means and means for turning off the power supply.

Regulated power supplies are designed to supply predetermined voltage or current to a load. Highly regulated, stable power supplies are available. During normal steady-state operation the regulated voltage or current remains constant and no problems exist. Many loads for which such power supplies are used are extremely sensitive to overvoltage conditions, even those of extremely short duration. Power supplies having large capacitors across the output terminals tend to absorb short duration overvoltage tendencies or "spikes." For such power supplies overvoltage protective devices are designed to respond after a short delay so that, for example, turn-on transients will not trip the power supply off at once. This leaves a source of possible trouble, i.e. the turn-on transient unprovided for. In addition, fast-slewing rate power supplies have little or no capacity across their output terminals and turn-on and similar transients are greater than in conventional power supplies. Such transients may not be tolerable with some types of overvoltage sensitive loads.

INVENTOR.
JOSEPH R. GATELY
BY Alfred W. Barber

INVENTOR.
JOSEPH R. GATELY
BY Alfred W. Barber

OVERVOLTAGE PROTECTOR FOR THE LOAD OF FAST-SLEWING REGULATED POWER SUPPLIES

U.S. Pat. No. 3,449,634 entitled "Overvoltage Protection Device for Regulated Power Supplies" describes a state-of-the-art overvoltage protection system as set forth above.

The present invention provides an overvoltage protective system which clamps short duration spikes and crowbars and turns off the power supply in the presence of overvoltage conditions lasting more than the predetermined length of time. It is particularly applicable but not limited to use with high slewing rate regulated power supplies. The control means comprises an adjustable circuit which compares the output voltage or a portion of the output voltage with a reference voltage. Whenever the output voltage so monitored exceeds a predetermined level even for an instant, a clamping means shunts the output terminals limiting the output voltage to this predetermined level. At the same time the overvoltage is applied to a delay circuit which in turn is connected to a crowbar and circuit breaker. The clamping means is a device, such as a transistor, which releases at once if the overvoltage condition ceases to exist. However, the crowbar once triggered remains as a virtual short circuit across the output until the output voltage is reduced to substantially zero. The circuit breaker also turns off the power supply and must be reset to turn it back on again. The delay circuit is noncumulative so that repeated transients do not trigger the crowbar and circuit breaker, only a prolonged overvoltage condition being effective to trip the final turnoff means. In this way short duration overvoltage conditions are effectively counted without turning the power supply off whereas overvoltage conditions of a prolonged nature, generally signifying fault conditions, crowbar the power supply and turn it off. In the drawing:

Figure 1:
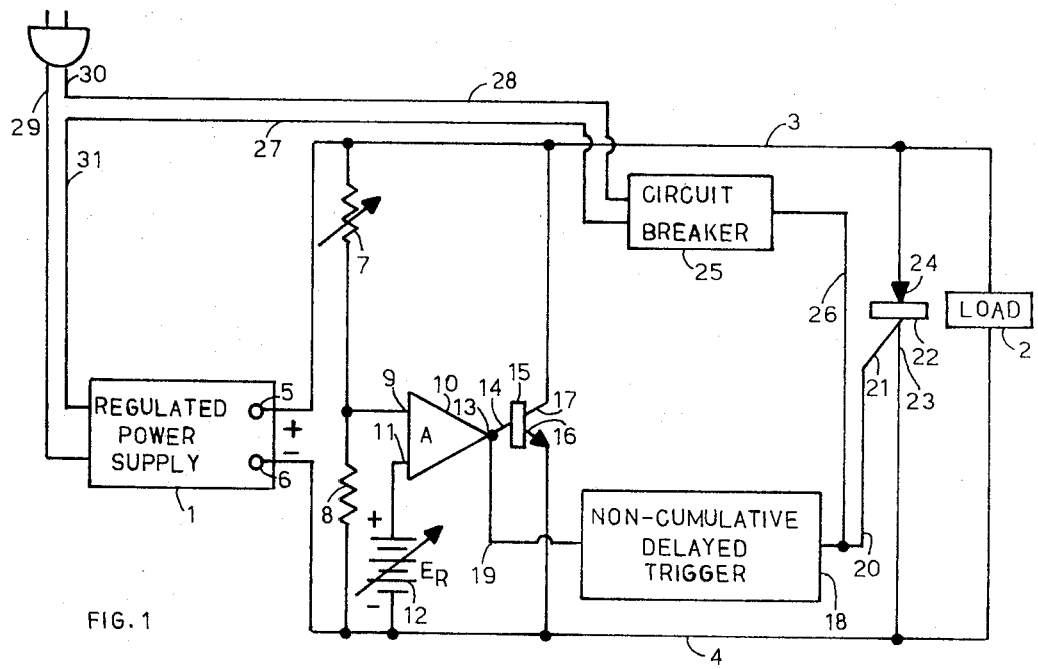
FIG. 1 is a simplified schematic circuit diagram partly in block form of the preferred form of the present invention connected to a regulated power supply the load of which is being protected.

FIG. 1 shows a regulated power supply connected to a load 2 over leads 3 and 4, lead 3 being connected to positive output terminal 5 and lead 4 being connected to negative output terminal 6. The load protective circuit is bridged across the load between leads 3 and 4. First, a voltage divider comprising resistors 7 and 8 are connected in series across leads 3 and 4 and the junction point is connected to one input 9 of a voltage comparator amplifier 10. The second input 11 is connected to a variable source of reference voltage 12. The voltage divider is variable as by making resistor 7 a variable resistor so that a predetermined portion of the output voltage can be applied to comparator 10. By making reference voltage 12 also variable, a wide range of voltage from zero to the maximum rated voltage of the power supply can be present when the voltage at input 9 equals the input at input 11. Comparator amplifier 10 is chosen and poled so that when the voltage on input 9 is more positive than the voltage on input 11 an output voltage of a predetermined polarity appears at output terminal 13. In the circuit as shown, this output voltage is chosen to be positive with respect to lead 4. Output terminal 13 is connected to base 14 of power transistor 15, emitter 16 is connected to negative lead 4 and collector 17 is connected to positive lead 3. Thus, when a positive output voltage appears at output terminal 13 signaling that the voltage across load 2 is greater than a predetermined voltage, transistor 15 is instantly rendered conducting placing a heavy shunt across the output terminals 5 and 6 of the power supply thereby preventing further increase in the voltage across load 2. With no delay circuits involved, shunting is instantaneous as is the relaxing of the shunting the instant the voltage across the load drops below the predetermined present value. Thus, transistor 15 acts as a shunt regulator for voltages across the load greater than the preset value.

Further circuits are combined to become effective if the overvoltage condition persists longer than a predetermined period of time. The output voltage at terminal 13 is applied to a noncumulative delay trigger 18 over lead 19. This trigger acts on each overvoltage condition which persists longer than a predetermined period of time and puts out a trigger pulse over lead 20 to gate 21 of the crowbar connected silicon controlled rectifier 22. Cathode 23 is connected to negative lead 4 and anode 24 is connected to positive lead 3. Thus, when silicon-controlled rectifier 22 is fired in response to the trigger pulse on gate 21, it effectively shorts the output terminals 5 and 6 of the power supply causing the voltage across the load to rapidly decrease to substantially the forward voltage drop of the SCR crowbar. The output pulse from trigger 18 is also applied to a circuit breaker 25 over lead 26 and the circuit breaker in response to the trigger pulse opens leads 27—28 in series with the power supply input power leads 29—30—31 removing input power from the power supply 1. In order to restore output voltage after the crowbar and circuit breaker operation, the power supply output voltage must drop to substantially zero to allow the silicon-controlled rectifier to go out of conduction and the circuit breaker must be reset.

Figure 2:
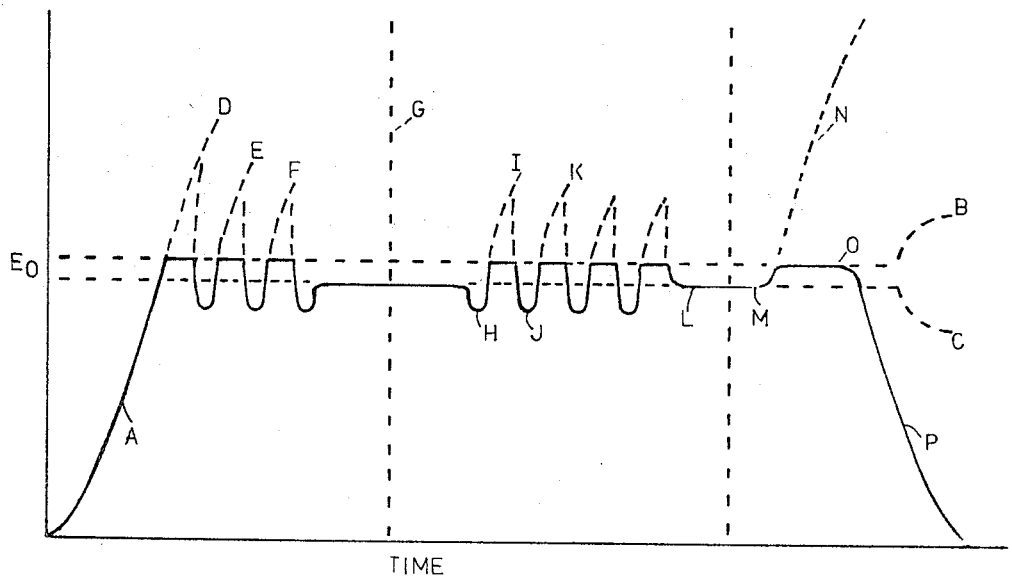
FIG. 2 is a graphical representation useful in explaining the operation of the present invention.

FIG. 2 is a series of graphical representations illustrating the above described operation. $E_0$ the voltage across load 2 is plotted vertically against the horizontal time axis. The curve between the origin and the vertical dotted line G represents a typical turn-on characteristic with horizontal line C representing a desired operating voltage across the load and horizontal line B representing the present limiting or clipping level of voltage across the load. This latter is the level to which the load voltage is clamped by transistor 15 responding to transient, short duration excursions above the clipping level and also the voltage, if of longer than a predetermined time duration, the clipping level setting off crowbar silicon-controlled rectifier 22. Now, considering the time between the origin and vertical time line G. This is the time from the time the power supply switch is turned to ON until the power supply has reached steady-state operating voltage C. Initially the voltage will rise along portion A of the curve and if not would rapidly increase to point D well above the final regulating voltage. However, as described above, transistor 15 (FIG. 1) will clip the voltage across the load at a value B and the load voltage will turn horizontally along the solid line. The turn-on transient continuing may dip down slightly below C and then attempt to rise again to a value E, again being clipped by transistor 15 and so on at F until it settles to the value C as shown by the horizontal solid line as it intersects vertical G. The time interval between G and R represents the operation of this power supply when the load is heavily pulsed causing transients such as H—I, J—K and so on. The load voltage may dip at the instant of pulsing dipping to H and then attempt to overcompensate by rising to I. However, again clipping transistor 15 constrains the maximum load voltage to level B and the actual load value follows the solid line. This will be repeated at each pulse in the load as at J—K and so on with the same result until the pulsing ceases and the load voltage returns to the preset level at L. The time interval beyond time R represents the results of an overload lasting longer than a predetermined period of time, i.e. longer than a turn-on or pulsed load transient as determined by delayed trigger 18 (FIG. 1). The load voltage is assumed to be constant along level C until time M when the load voltage starts to rise for any reason. When the load voltage reaches level B, the clamping action of transistor 15 prevents any further rise although without such clamping the load voltage would have risen along curve N. However, since the excess load voltage persists as indicated by curve N beyond the delay time setting of delay trigger 18, the clamping continues to point 0 at which time the crowbar action of silicon controlled rectifier 22 takes place and the load (terminal) voltage is programmed swiftly downward along curve P. At the same time the input AC power to the power supply is opened so that the load (terminal) voltage approaches zero and does not rise again until circuit breaker 25 (FIG. 1) is reset.

Figure 3:
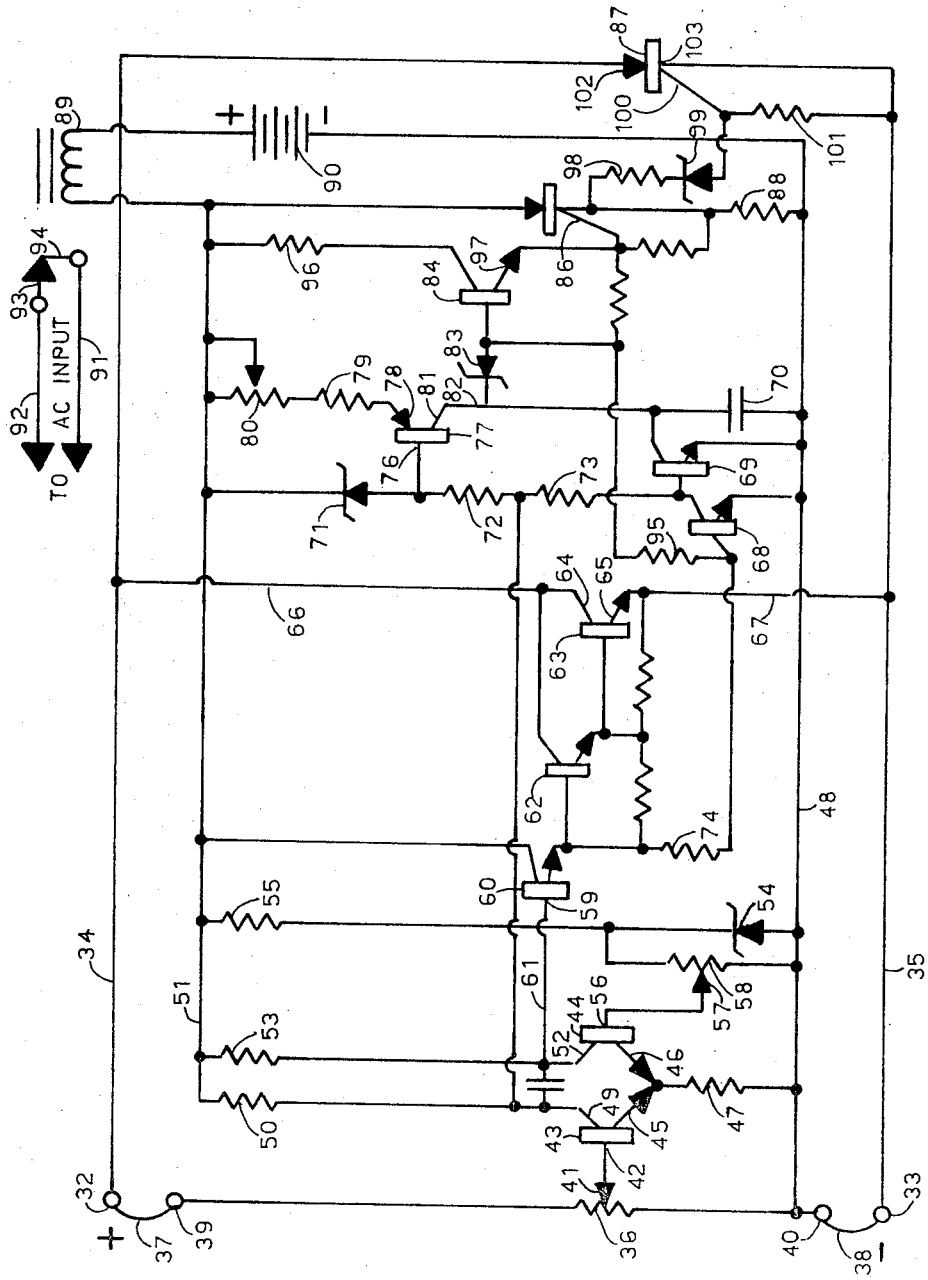
FIG. 3 is a complete schematic circuit diagram in detail of the preferred form of the present invention.

FIG. 3, the detailed schematic circuit diagram of the preferred form of the present invention is intended to be connected to the positive output terminal 32 and the negative output terminal 33, by means of leads 34 and 35 respectively, of the power supply the load of which is to be protected. The voltage across the load to be protected appears across potentiometer 36 and this potentiometer may be connected to a remote load by opening links 37 and 38 and connecting the input terminals 39 and 40 to the load over leads not carrying load current so that the actual voltage across the load is monitored regardless of lead voltage drop. A portion of the voltage across the load selected by positioning variable arm 41 of potentiometer 36 is applied to base 42 of input transistor 43. A second transistor 44 is connected as the second of a differential pair with transistor 43. Emitters 45 and 46 are joined and connected through a common emitter resistor 47 to the common negative lead 48. Collector 49 is connected through collector load resistor 50 to common positive lead 51 and collector 52 is connected through collector load resistor 53 to this same common positive lead 51. A source of reference voltage is provided across zener diode 54 receiving current through resistor 55. A predetermined portion of this reference voltage is applied to base 56 from the adjustable arm 57 of potentiometer 58 connected across zener diode 54. The two transistors 43 and 44 connected in this manner provide outputs which are in accordance with which of the two receives the more positive voltage on its base. The transistor receiving the more positive voltage on its base conducts dropping its collector voltage to a low value while the voltage of the other collector rises, since the first said transistor is conducting and the second nonconducting. Thus, as long as the portion of the reference voltage on base 56 is greater than the portion of the load voltage on base 42, collector 49 will be at a relatively high voltage and collector 52 will be at a relatively low voltage. The settings of potentiometer arms 57 and 41 are chosen so that at the predetermined load voltage the voltages on bases 42 and 56 are nearly equal and any increase in voltage across the load being protected will cause the voltage on base 42 to be greater than the voltage on base 56 and the voltage on collector 49 will drop while the voltage on collector 52 will rise. The voltage on collector 52 is applied to base 59 of transistor 60 over lead 61. Thus, when the voltage on collector 52 rises, transistor 60 is made to conduct. Transistor 60 is emitter coupled to transistor 62 which in turn is emitter coupled to transistor 63 so that transistor 63 is also driven into conduction. The gain of transistors 43 and 44 provide a high degree of voltage sensitivity in making the voltage comparison and the two stages of current amplification provided by transistors 60 and 62 drive transistor 63 into heavy conduction. Collector 64 is connected to positive power supply terminal 32 over leads 66 and 34 and emitter 65 is connected to negative power supply terminal 33 over leads 67 and 35 so that when transistor 63 is driven into heavy conduction, a heavy shunt or clamp is placed across the power supply output terminals instantly dropping the terminal voltage to the predetermined value.

This clamping provided by transistor 63 takes care of short duration overvoltage conditions as shown in FIG. 2. The load voltage $E_0$ from the time origin to the time represented by dotted line G may be taken as the operation of the system during turn-on from the instant of turn-on at 0 until the power supply has settled at the predetermined output voltage along dotted voltage line C. Initially the voltage rises along line A and would overshoot sharply as to point D but is clipped at the level represented by dotted line B by the action of transistor 62 as described above. The load voltage may then dip and rise again to further peaks of decreasing amplitude as E and F and similarly limited by transistor 62 to a level B. In a similar manner peaks in load voltage which may be induced by pulsed loads, for example, are limited as illustrated in the time interval between vertical time lines G to R. A pulsed load or the like may cause the load voltage to dip as at H and J and recovery in the power supply regulator may tend to cause overvoltage peaks as I and K. However, transistor 62 will limit these upward surges of voltage to level B until the end of the pulse-loading time when the load voltage again becomes regulated at value C along line L. The action of the circuit in the presence of prolonged overvoltage conditions is illustrated to the right of time line R and will now be described.

Returning to FIG. 3, during normal operation of the power supply, capacitor 70 is effectively shorted by transistor 69 since its base is positively biassed through zener diode 71 and resistors 72 and 73 in series. When an overvoltage condition is initiated, a positive bias from the circuit which turns transistor 63 on, as described above, is provided as from the emitter of transistor 60 through resistor 74 to the base of transistor 68 putting it in conduction. When transistor 68 becomes conductive the impedance between the collector and emitter of transistor 68 becomes very low and the base of transistor 69 connected to the collector of transistor 68 is robbed of current and the collector to emitter impedance of transistor 69 connected across capacitor 70 becomes high so that capacitor 70 can accept a charge. At the same time the overvoltage condition has rendered transistor 43 conducting and the potential of collector 49 will be pulled down. Thus, the voltage on lead 75 to the junction between resistors 72 and 73 will be pulled in a negative direction along with base 76 of transistor 77. This causes transistor 77 to conduct and supply a constant current from its collector 81 over lead 82 to start charging capacitor 70. The magnitude of this constant current is determined by the regulating voltage of zener diode 71 and the combined series resistance of resistors 79 and 80 connected in series with emitter 78. The value of the regulated current will be equal to the zener diode regulating voltage minus the base to emitter drop of transistor 77 divided by the resistance of resistors 79 and 80 taken in series. Resistor 80 is shown variable so that the current can be adjusted to a desired value.

If the overvoltage condition persists, the voltage across capacitor 70 will continue to rise. If it reaches a voltage equal to the regulating voltage of zener diode 83 plus the base to emitter conduction voltage of transistor 84 plus the turn-on voltage of gate 86 of silicon-controlled rectifier 85, silicon-controlled rectifier 85 will fire in turn firing silicon-controlled rectifier 87 applying a virtual short circuit across output terminals 32 and 33 of the power supply over leads 34 and 35. When silicon-controlled rectifier 85 fires, current flows through resistor 88 and circuit breaker coil 89 from a suitable source of voltage such as illustrated by battery 90 opening the power supply input AC circuit lines 91 and 92 by the opening of circuit breaker contacts 93—94.

To follow the operation as briefly described above more closely, the positive voltage passed by resistor 74 is applied to the base of transistor 84 and across zener diode 83 through resistor 95 zener diode 83 provides a standoff voltage between the voltage across capacitor 70 so that the firing of silicon-controlled rectifier 85 can be accurately determined. When the voltage across capacitor 70 exceeds the zener diode regulating voltage plus the base to emitter conduction voltage of transistor 84 current is permitted to flow from line 51 through resistor 96 and transistor 84 and when the potential of emitter 97 exceeds the firing voltage of gate 86 this current flowing to gate 86 fires silicon-controlled rectifier 85. With silicon-controlled rectifier 85 conducting current flows through it, circuit breaker coil 89 and resistor 88 from potential source 90. The current through coil 89 opens contacts 93—94 and interrupts the AC power line 91—92 as described above removing input power to the power supply. The voltage drop across resistor 88 is applied to resistor 98, isolating zener diode 99 and across stabilizing resistor 101 to gate 100 of silicon-controlled rectifier 87 causing it to go into conduction. Anode 102 is connected over line 34 to power supply output connected terminal 32 and cathode 103 is connected over line 35 to power supply output connected terminal 33 so that silicon-controlled rectifier 87 shorts the power supply output and in turn the voltage across the load connected to terminals 39 and 40 over connecting links 37 and 38.

Returning to the timing diagram of FIG. 2, the prolonged overvoltage condition which results in the action just described starts at M and would have proceeded along a line such as N were it not clamped to level B by transistor 63. Since this overvoltage condition persists, at a predetermined time (determined by the various factors described above) such as o, the action of the silicon-controlled rectifiers 85 and 87 takes place and the load voltage is brought down along a steep curve as P until it becomes essentially zero (actually the minimum drop across silicon-controlled rectifier 87).

When the cause of the overvoltage has been removed and the input to the power supply restored as by closing circuit breaker contacts 93—94 the system returns to its initial condition. Capacitor 70 is discharged and held at a low voltage by transistor 69 and the system starts up as along curve A as described above.

It should be noted that in the presence of short periods of overvoltage, each time the load voltage returns to normal capacitor 70 is shunted and thus discharged so that there is essentially no cumulative effect due to short time overvoltage conditions.

I claim:

1. In a load-protecting system for regulated power supplies, the combination of:
   a pair of terminals for connection to a load to be protected;
   first signal responsive shunting means connected to said terminals;
   a source of reference voltage;
   means for comparing a portion of the voltage between said terminals with said reference voltage for deriving a difference voltage;
   means for amplifying the difference voltage to provide an output control signal;
   means for applying the control signal to said shunting means to activate said shunting means in the presence of a difference voltage greater than a predetermined voltage;
   a second signal responsive shunting means connected to said terminals;
   and a time delay circuit means connected between said amplifier and said second shunting means for activating said second shunting means in response to a difference voltage persisting for longer than a predetermined period of time.

2. A load-protecting system as set forth in claim 1;
   and including circuit breaker means coupled to said time delay circuit means.

3. A load-protecting system as set forth in claim 1;
   wherein said first shunting means is a bipolar transistor and said second shunting means is a silicon controlled rectifier.

4. A load-protecting system as set forth in claim 1;
   wherein said time delay circuit means is substantially noncumulative.

5. A load-protecting system as set forth in claim 1;
   and including means for varying the portion of voltage between said terminals which is compared with said reference voltage.

6. A load-protecting system as set forth in claim 1;
   wherein said time delay circuit means includes a capacitor, controlled rate charging means for said capacitor and fast discharge means for said capacitor.